United States Patent
Ciavaglia et al.

(12) 
(10) Patent No.: US 6,397,306 B2
(45) Date of Patent: May 28, 2002

(54) PER MEMORY ATOMIC ACCESS FOR DISTRIBUTED MEMORY MULTIPROCESSOR ARCHITECTURE

(75) Inventors: Stephen Ciavaglia, Merrimack, NH (US); Arthur L. Zaifman, Marblehead; Edward C. Szajner, Jr., Leominster, both of MA (US); Edward Spang, Nashua, NH (US)

(73) Assignee: Alcatel Internetworking, Inc., Calabasas, CA (US)

( * ) Notice: Subject to any disclaimer, the term of this patent is extended or adjusted under 35 U.S.C. 154(b) by 0 days.

(21) Appl. No.: 09/178,007

(22) Filed: Oct. 23, 1998

(51) Int. Cl.$^7$ ............................................... G06F 12/00
(52) U.S. Cl. ........................ 711/148; 711/150; 711/163
(58) Field of Search ................................ 711/147, 148, 711/150, 152, 163

(56) References Cited

U.S. PATENT DOCUMENTS 5,175,829 A    12/1992  Stumpf
5,297,269 A  *  3/1994  Donaldson et al. ......... 395/425

* cited by examiner

Primary Examiner—Kevin Verbrugge
(74) Attorney, Agent, or Firm—Scot A. Reader, Esq.

(57) ABSTRACT

"Per memory" atomic access for a distributed memory multiprocessor architecture is provided by marking bit masks for shared memories to indicate the access privileges of processors to the memories. A processor has access privileges to a shared memory if the bit mask retained for the memory is marked at a bit position reserved for the processor and does not have access privileges if the bit mask is not so marked. A bit mask is permitted to have only one mark at a given time to guarantee that access to each shared memory is atomic.

23 Claims, 3 Drawing Sheets

PER MEMORY ATOMIC ACCESS FOR DISTRIBUTED MEMORY MULTIPROCESSOR ARCHITECTURE

BACKGROUND OF THE INVENTION

The present invention relates to distributed memory multiprocessor architectures, and more particularly to methods and devices for providing atomic access in distributed memory multiprocessor architectures.

In distributed memory multiprocessor architectures, also known as non-uniform memory architectures (NUMAs), each processor has a direct physical connection to a local memory associated with the processor and an indirect physical connection to remote memories associated with other processors. The physical connections are used for executing read and write transactions. To sustain operation within such an architecture, any read-modify-write sequence initiated at a shared memory location must be completed before another such sequence is initiated in the memory location. This typically requires that a processor conducting a read-modify-write sequence have exclusive, or "atomic", access to the shared memory during the interval in which the sequence is executed. Conventionally, atomic access has been ensured through global blocking. In global blocking, all processors except one granted atomic access are inhibited from using any shared transmission medium in the architecture during the atomic access interval. That way, the inhibited processors are unable to disrupt the read-modify-write sequence in progress.

Global blocking has obvious disadvantages in terms of efficiency. Sustained operation only demands that a processor executing a read-modify-write sequence have atomic access to a particular memory during an interval. However, global blocking prevents other processors from accessing any memory during an atomic access interval. Global blocking therefore results in gross underutilization of shared transmission media and memory resources. This underutilization yields slower operating performance.

Accordingly, there is a need for methods and devices for providing atomic access to shared memories in distributed memory multiprocessor architectures which do not suffer from the disadvantages of global blocking.

SUMMARY OF THE INVENTION

In its most basic feature, the present invention provides "per memory" atomic access for a distributed memory multiprocessor architecture. A bit mask having a plurality of bits is retained for each shared memory to indicate the access privileges of a plurality of processors to the memory. A processor has access privileges to a shared memory if the bit mask retained for the memory is marked at a bit position reserved for the processor and does not have access privileges if the bit mask is not so marked. A processor must establish and confirm access privileges before initiating a read-modify-write sequence in the shared memory. If the processor is able to establish and confirm access privileges, the processor may initiate the sequence. However, if the processor is unable to establish and confirm access privileges, the processor may not initiate the sequence. A bit mask is permitted to have only one mark at a given time to guarantee that access to each shared memory is atomic.

In a preferred atomic access establishment and confirmation protocol, when a processor wishes to initiate a read-modify-write sequence in a shared memory, the processor attempts to establish atomic access by issuing a write instruction to mark the bit mask retained for the memory at the processor's reserved bit position. The write is successful if the bit mask is not already marked. However, the write is unsuccessful if the bit mask is already marked. The processor attempts to confirm atomic access by reading the bit mask. If the bit mask is marked at the processor's reserved bit position, atomic access is confirmed. If the bit mask is not marked at the processor's reserved bit position, atomic access is not confirmed.

The present invention may be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1:
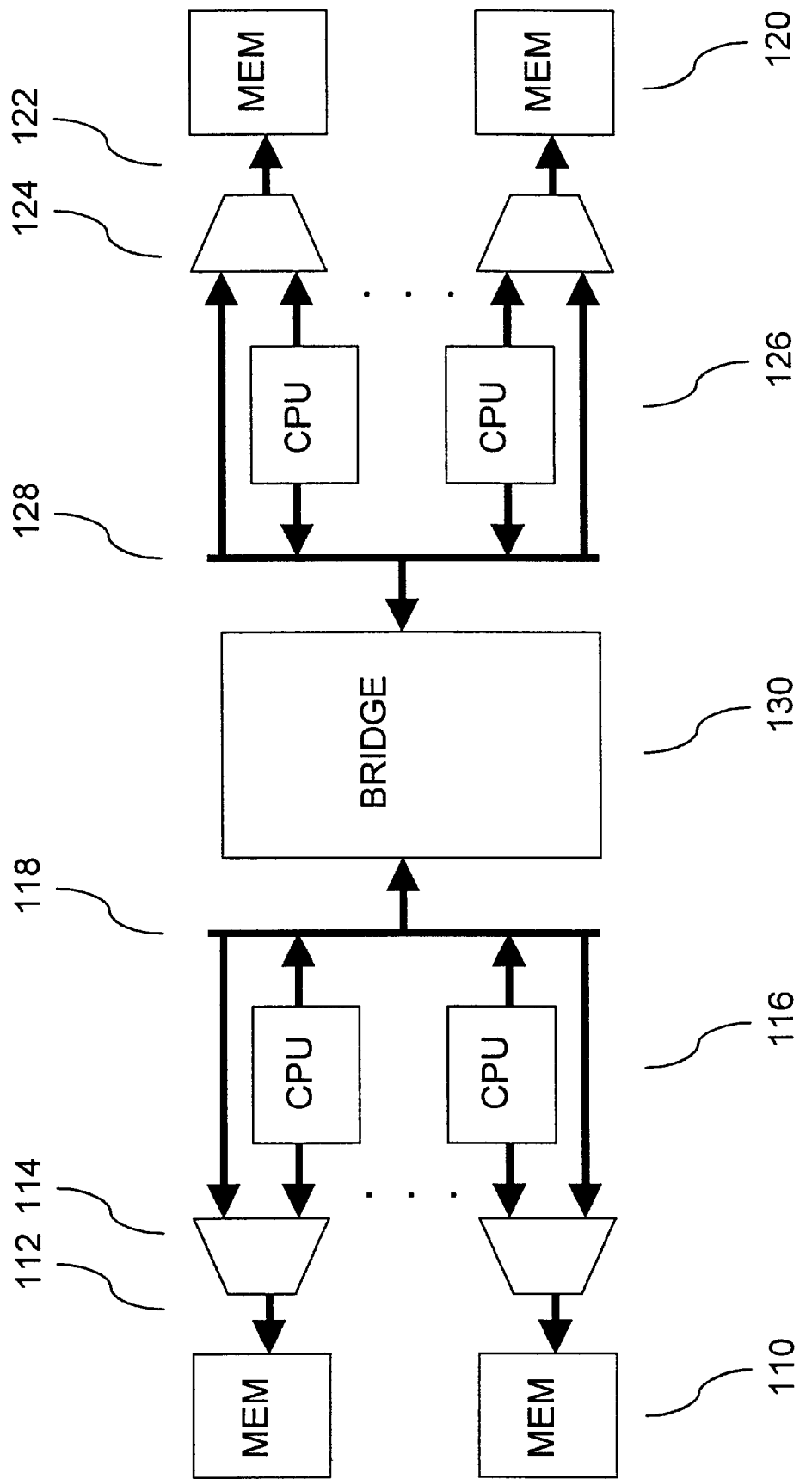
FIG. 1 illustrates a distributed memory multiprocessor architecture operative in accordance with the present invention.

In FIG. 1, a distributed memory multiprocessor architecture in which the present invention is operative is shown. The architecture includes a plurality of processors 116, 126 and a bridge 130 dividing the processors into two segments 116 and 126, respectively. Processors 116, 126 run an operating system adapted for a distributed memory multiprocessor architecture. Processors 116, 126 have associated memories 110, 120 for retaining values defined in the operating system. All memories are referenceable by all processors 116, 126. Local memory references are conducted over local buses 112, 122 via multiplexors 114, 124. Non-local memory references are conducted over global buses 118, 128 and local buses 112, 122 via multiplexors 114, 124. Memory referencing operations include read transactions in which data are retrieved from a memory location in a memory element and write transactions in which data are received in a memory location in a memory element. Global physical addresses (GPAs) are used to identify the target memory locations for read and write transactions. Each memory element supports at least one GPA. Although two processor/memory pairs are shown on each segment, the number of processor/memory pairs on a segment may be one or more. Moreover, although two segments are shown, the number of segments may be one or more. Dynamic random access memory (DRAM) is contemplated for memories 110, 120.

It will be appreciated from the above brief architectural description that during any particular interval, a processor may wish to initiate a read-modify-write sequence at a memory location at which another processor is presently conducting such a sequence. If the second processor is not inhibited, the second processor would read, modify and write a value at the memory location which does not yet reflect the first processor's modifying activity. Accordingly, allowing contemporaneous modification would yield spurious data and cause system errors. A primary objective of the present invention is to prevent such contemporaneous modification by ensuring atomic access to memory elements in a distributed memory multiprocessor architecture, without underutilizing transmission media and memory resources. This objective is met through an advantageous implementation of "per memory" bit masks, in a manner hereinafter explained in greater detail.

Figure 2:
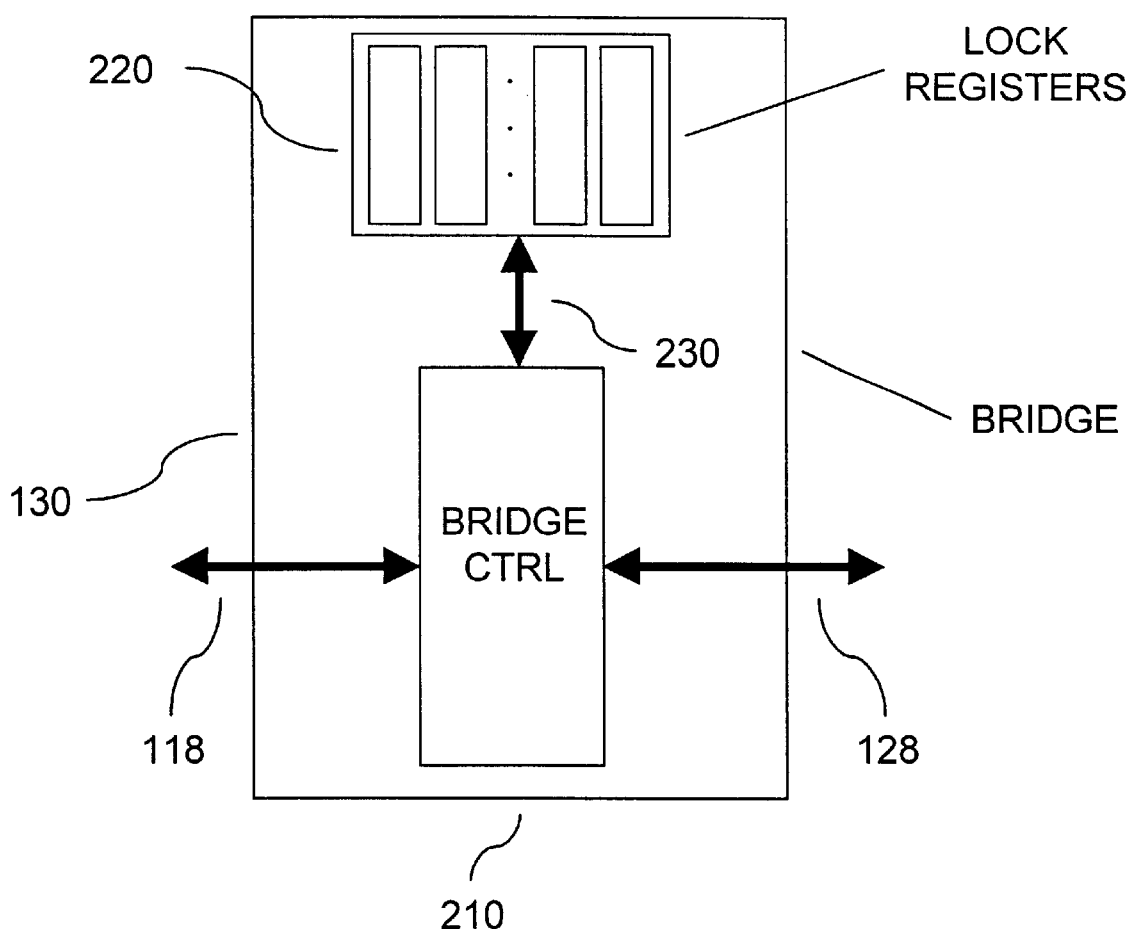
FIG. 2 illustrates a bridge operative within the distributed memory multiprocessor architecture according to FIG. 1.

Turning to FIG. 2, bridge 130 is illustrated in greater detail. Bridge 130 includes bridge controller 210 and lock registers 220 interconnected over bridge bus 230. Bridge controller 210 regulates access to global buses 118, 128 and to bridge bus 230. Controller 210 also routes memory reference requests. Regulation of bus access is necessary to prevent contention. When there is competition for a bus, bridge controller 210 resolves the competition through arbitration. Memory reference request routing is required to direct read and write requests to the correct bus, i.e., the bus supporting the GPA identified by the request. In this regard, each read and write request has associated with it a GPA. Controller 210 has a GPA-to-memory mapping for the entire GPA range in the architecture and consults the mapping to resolve GPAs to their target memory element. Requests are routed on the bus on which the resolved target memory element resides. Memory elements addressable in the architecture include memories 110, 120 and lock registers 220. Each one of memories 110, 120 is addressable by a range of GPAs. Each one of lock registers 220 is addressable by a particular GPA. To avoid ambiguity in target memory element resolution, every GPA assigned in the architecture is unique.

Figure 3:
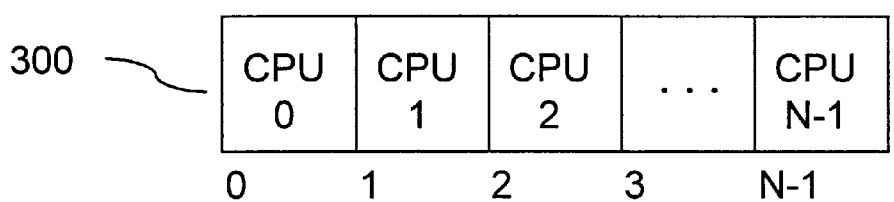
FIG. 3 illustrates the format of a bit mask operative within the distributed memory multiprocessor architecture according to FIG. 1.

Lock registers 220 retain bit masks indicating which processors, if any, presently have atomic access to memories 110, 120. Each lock register is associated with a different memory. Processors 116, 126 know the memories 110, 120 with which lock registers 220 are associated through a mapping of lock register GPAs with memory GPA ranges. Lock registers 220 are each N bits wide. Turning now to FIG. 3, the format of a representative lock register bit mask 300 is illustrated in greater detail. The bit mask format includes N bit positions, where N is the number of processors within the architecture. Each bit position is conditionally writeable by a particular processor and is unconditionally readable by all processors. Thus, in the illustrated example, processor CPU 0 would have conditional write privileges to bit position 0 and would have read privileges to all bit positions 0 to N−1. A processor's ability to initiate a read-modify-write sequence in one of memories 110, 120 is determined by whether the processor can confirm that the memory's bit mask is marked at the bit position reserved for writing by the processor. For example, taking the processor-bit position association of FIG. 3 and assuming a value of "0" indicates no mark and a value of "1" indicates a mark, a bit mask "100 . . . 0" would enable CPU 0 to initiate a read-modify-write sequence upon confirmation, a bit mask "010 . . . 0" would enable CPU 1 to initiate a read-modify-write sequence upon confirmation, and so on. Naturally, a reciprocal value system may alternatively be used wherein "0" represents a mark and "1" represents no mark.

Figure 4:
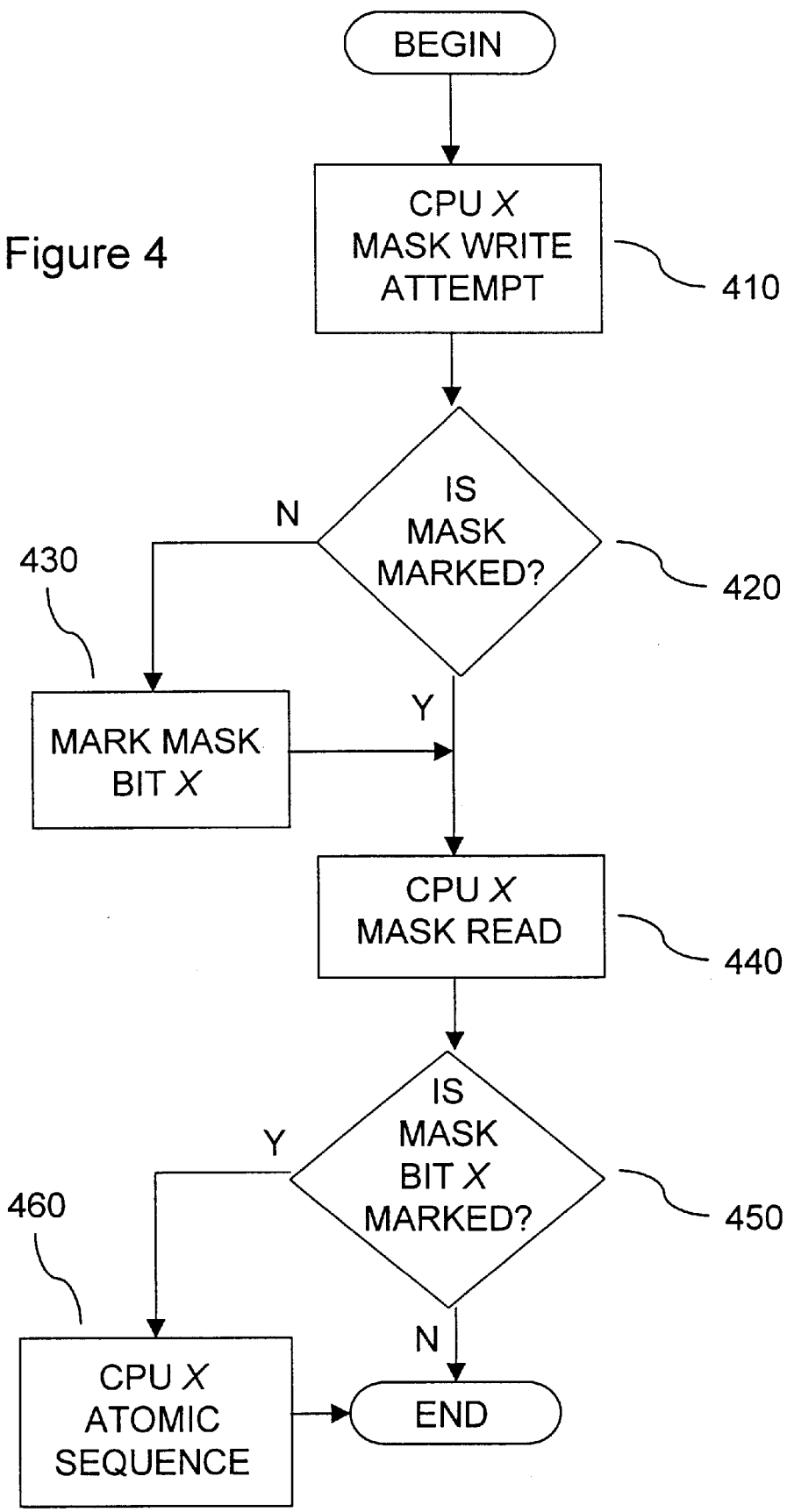
FIG. 4 is a flow diagram describing an atomic access establishment and confirmation protocol operative within the distributed memory multiprocessor architecture according to FIG. 1.

In the basic atomic access establishment and confirmation protocol, a processor attempts to establish and confirm atomic access to a memory by conducting a write-read cycle. The basic protocol is described in the flow diagram of FIG. 4. When a representative processor X wishes to initiate a read-modify-write sequence in one of memories 110, 120, processor X attempts to mark the bit mask associated with the target memory at processor X's reserved bit position (410). More particularly, processor X resolves the GPA of the target memory location to the GPA of the lock register in which the target memory's bit mark resides and issues a write instruction to the lock register using the resolved GPA. The write instruction instructs to mark the bit mask at processor X,s reserved bit position and is transmitted to bridge controller 210 on the global bus interconnecting processor X and controller 210 at a time when processor X has been granted control of the global bus. Before the write is executed, however, controller 210 retrieves the bit mask from the lock register and compares it with an unmarked bit mask (e.g., "000 . . . 0") in an AND operation (420). This AND operation reveals whether the bit mask is already marked, i.e., whether another processor already has atomic access. If the bit mask is unmarked, it is known that no other processor currently has atomic access to the target memory and the write is executed by marking the bit mask at processor X's reserved bit position (430). Naturally, if the bit mask is already marked, the write is not executed. Whether or not the write was executed, processor X attempts to confirm atomic access by issuing a read instruction to the lock register (440). The read instruction instructs to retrieve the entire bit mask and return it to processor X. The read instruction is transmitted to controller 210 on the global bus interconnecting processor X and controller 210 when processor X again has access to the global bus. The bit mask is returned to processor X on the global bus. Processor X compares the returned bit mask with a bit mask having a mark at processor X's reserved bit position (e.g., "100 . . . 0", assuming X equals zero) in an AND operation to reveal whether processor X's write was executed (450). If the bit mask is marked at processor X's reserved bit, it is confirmed that processor X has atomic access to the target memory and processor X initiates an atomic read-modify-write sequences in the target memory (460). Of course, if the bit mask is not marked at processor X's reserved bit position, atomic access was not confirmed and processor X must postpone its atomic read-modify-write sequence until confirmation is eventually established through the foregoing protocol. Naturally, the mark at processor X's reserved bit position is erased after completing one or more atomic sequences so that other processors may initiate atomic sequences in the target memory through the foregoing protocol.

Various modifications of the above-described architecture and protocol are possible. For instance, lock registers may be configured to be accessible out-of-band on dedicated buses. Nevertheless, at a fundamental level, the architecture and protocol described in a preferred embodiment represent a significant advance over architectures and protocols relying on global blocking to guarantee atomic access. All transmission media advantageously remain open at all times to all processors. Accordingly, contemporaneously with the memory reference being performed by the processor having atomic access to a particular memory, other processors may advantageously conduct memory references in other shared memories (to which such processors have atomic access) and in any dedicated memories.

Accordingly, it will be appreciated by those of ordinary skill in the art that the invention can be embodied in other specific forms without departing from the spirit or essential character hereof. The present invention is therefore considered in all respects illustrative and not restrictive. The scope of the invention is indicated by the appended claims, and all changes that come within the range of equivalents thereof are intended to be embraced therein.

We claim:

1. A multiprocessor system architecture comprising:
a plurality of processors;
a plurality of memories for access by at least one of the processors;
a bridge coupled between at least two processors, the bridge providing access between the processors and at least one of the memories, the bridge including a bridge controller, said bridge controller being capable of regulating access to a bus shared by said at least two processors to access the memories, and a plurality of lock registers, each lock register retaining a bit mask and each lock register being associated with one of the memories;
means for accessing a particular bit mask retained in a particular lock register, the particular lock register being associated with a particular memory;
means for determining if the particular bit mask is marked; and
initiating means, if the particular bit mask is not marked, for marking the particular bit mask and initiating a memory reference,
wherein the memories and the processors are organized as a plurality of segments, each :segment including at least one of the processors and at least one of the memories.

2. The multiprocessor architecture of claim 1 wherein each bit mask has a plurality of bit positions and the marking means marks the particular bit mask at a bit position reserved for a particular processor.

3. The multiprocessor architecture of claim 2 wherein the initiating means initiates the memory reference between the particular processor and the particular memory.

4. The multiprocessor system architecture of claim 1 wherein each lock register is associated with a global physical address (GPA) and each memory is associated with one or more GPAs, and wherein the bridge controller has a GPA-to-memory mapping for all of the lock registers and the memories.

5. The multiprocessor system architecture of claim 4 wherein the processors determine which of the lock registers are associated with which of the memories through a mapping of the lock register GPAs with the memory GPAs.

6. The multiprocessor system architecture of claim 1 wherein the bridge controller is capable of regulating access to the shared bus through arbitration when there is contention between said at least two processors.

7. The multiprocessor system architecture of claim 1 wherein each bit mask has a plurality of bit positions, each bit position being reserved for a particular processor, wherein the particular processor has atomic access to the memory associated with the bit mask when its reserved bit position is marked in the bit mask.

8. The multiprocessor system architecture of claim 1 wherein the bridge divides the system into the plurality of segments.

9. A multiprocessor architecture having a plurality of processors, a plurality of memories, and a bridge and access buses interconnecting the processors and the memories for performing atomic memory references, the architecture comprising:
a bit mask on the bridge, said bit mask being associated with at least one memory;
means for accessing the bit mask associated with a particular memory;
means for determining if the bit mask is marked; and
initiating means, if the bit mask is not marked, for marking the bit mask and initiating a memory reference,
wherein the access buses include at least one local bus and at least one global bus,
wherein said at least one global bus is shared by at least two processors, and
wherein the bridge is capable of regulating bus access to said at least one global bus to prevent contention between said at least two processors.

10. The multiprocessor architecture of claim 9 wherein the bit mask has a plurality of bit positions and the marking means marks the bit mask at a bit position reserved for a particular processor.

11. The multiprocessor architecture of claim 10 wherein the initiating means initiates the memory reference between the particular processor and the particular memory.

12. A method for performing atomic memory references in a multiprocessor architecture, the architecture having a plurality of processors interconnected to a plurality of memories on access buses and a bridge, said access buses comprising at least one local bus and at least one global bus, and said at least one global bus is shared by at least two processors, the method comprising:
accessing a bit mask on the bridge, said bit mask being retained for a particular memory;
determining if the bit mask is marked;
if the bit mask is not marked, marking the bit mask and initiating a memory reference; and
regulating bus access to said at least one global bus to prevent contention between said at least two processors.

13. The method of claim 12 wherein the bit mask has a plurality of bit positions, and marking the bit mask comprises marking at a bit position reserved for a particular processor.

14. The method of claim 13 wherein initiating a memory reference comprises initiating the memory reference between the particular processor and the particular memory.

15. The method of claim 14 further comprising: if the memory reference is initiated, unmarking the bit mask upon completion of the memory reference.

16. The method of claim 12 wherein a particular lock register is associated with the particular memory, and the bit mask retained for the particular memory is retained in the particular lock register.

17. A method for confirming atomic access to a memory in a multiprocessor architecture, the architecture having a plurality of processors interconnected to a plurality of memories on access buses and a bridge, said access bus comprising at least one local bus and at least one global bus shared by at least two processors, the method comprising:
(a) accessing a bit mask on the bridge, said bit mask being retained for a particular memory, and having a plurality of bit positions reserved for different processors;
(b) determining if the bit mask is marked;
(c) if the bit mask is not marked, marking the bit mask at the bit position reserved for a particular processor;
(d) determining if the bit mask is marked at the bit position reserved for the particular processor;
(e) if the bit mask is marked at the bit position reserved for the particular processor, initiating a memory reference between the particular processor and the particular memory; and
(f) regulating bus access to said at least one global bus to prevent contention between said at least two processors so as to prevent bus contention.

18. The method of claim 17 wherein step (b) comprises:
(i) reading the bit mask from a memory element; and
(ii) comparing the bit mask with an unmarked bit mask in an AND operation.

19. The method of claim 18 wherein the multiprocessor architecture further comprises a plurality of lock registers, each lock register is associated with one of the memories, and each bit mask is retained in the lock register associated with the memory that it is associated with.

20. The method of claim 17 wherein step (d) comprises:
(i) reading the bit mask from a memory element; and
(ii) comparing the bit mask with a bit mask marked at the bit position reserved for the particular processor in an AND operation.

21. The method of claim 17 wherein a particular lock register is associated with the particular memory, and the bit mask retained for the particular memory is retained in the particular lock register.

22. A distributed memory multiprocessor architecture comprising:
a plurality of processors;
a plurality of memories interconnected to the plurality of processors over at least one local bus, at least one global bus and a bridge, wherein said at least one global bus is shared by at least two processors, and wherein the bridge is capable of regulating bus access to said at least one global bus to prevent contention between said at least two processors; and
a plurality of bit masks on the bridge, said bit masks being interconnected to the plurality of processors, wherein each processor has an access path to each bit mask, and wherein the bit masks are associated with respective ones of the plurality of memories, each bit mask having a plurality of bit positions reserved for respective ones of the plurality of processors;
wherein each processor has atomic access to each memory whose respective bit mask is marked at the bit position reserved for the processor.

23. The multiprocessor architecture of claim 22 wherein a lock register is associated with each memory, and a particular bit mask associated with one of the memories is retained in the lock register associated with that memory.

* * * * *